Sept. 15, 1942. J. H. WEINER 2,296,005
SIGNALING DEVICE
Filed Nov. 14, 1941
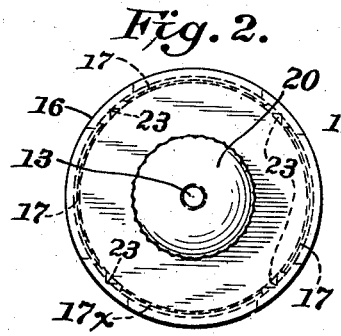
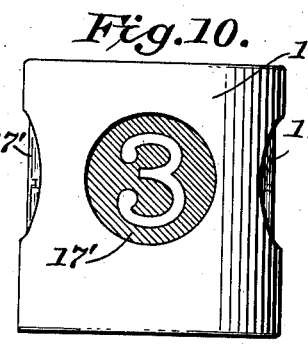
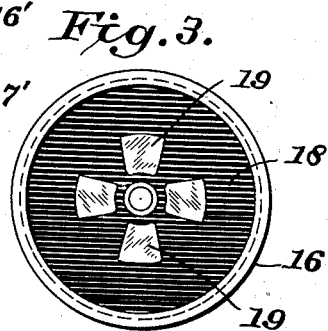
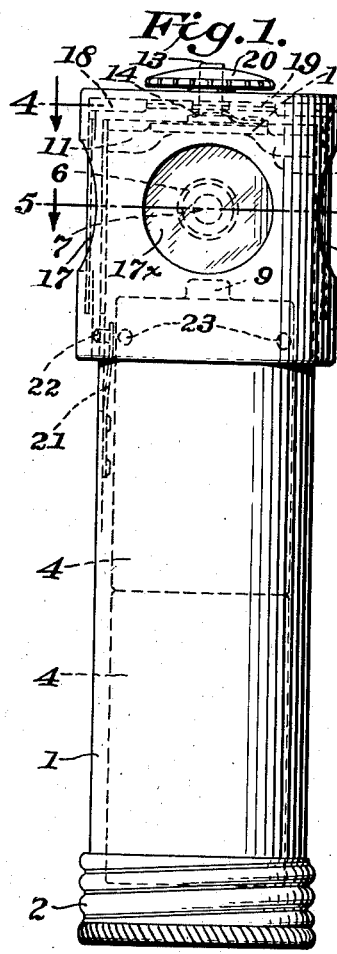
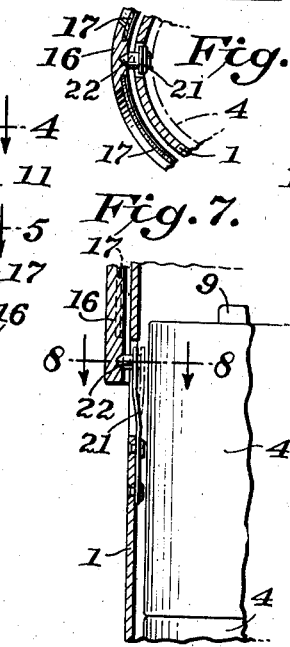
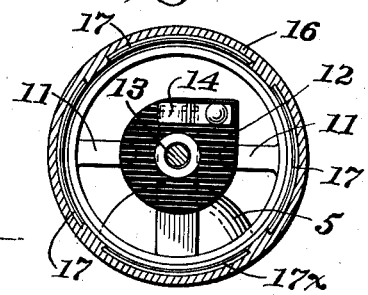
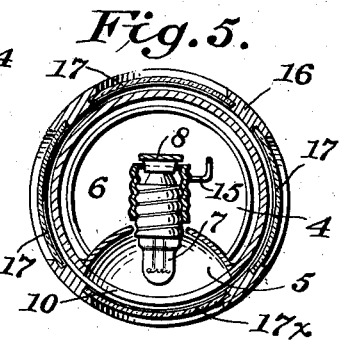
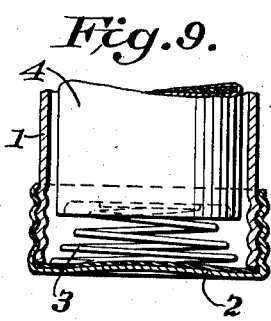
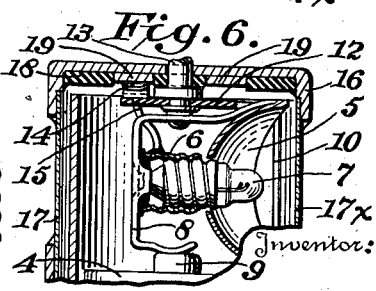
Inventor:
John H. Weiner,
By Parker Cook
Attorney.

Patented Sept. 15, 1942

2,296,005

UNITED STATES PATENT OFFICE 2,296,005

SIGNALING DEVICE

John H. Weiner, Canonsburg, Pa.

Application November 14, 1941, Serial No. 419,183

3 Claims. (Cl. 40—77)

My invention relates to new and useful improvements in signaling devices, and more particularly to a flash-light which is so constructed that different insignia may be flashed.

One of the principal objects of the invention is to provide a flash-light in which there may be four or more windows, each of which is distinguishable in that each window will have a different colored lens therein, or the lenses may have numerals thereon if so desired.

Another object of the invention is to provide a flash-light that may be used either by the militia or by citizens to flash a number of predetermined signals.

Still another object of the invention is to provide a flash-light that might be used in times of black-out, as the lenses may be translucent so that the light is not distinguishable from any great distances.

Still another object of the invention is to provide a flash-light to flash a plurality of signals, and may be efficiently used in theaters by ushers to signal when and how many vacant seats there are in certain rows, etc.

Still another object of the invention is to provide a flash-light signaling device which is simple in construction and simple in operation.

Still another object of the invention is to provide a flash light wherein a plurality of lenses is installed in a cap, which cap may be quickly and readily rotated so that different colored lenses may be readily placed in front of the lamp to give the desired signal.

Still another object of the invention is to provide a locking means for the rotatable cap, so that there is no danger of the flash-light being accidentally rotated to a flashing position when laid on a table or the like.

With these and other objects in view, the invention consists in certain new and novel arrangements and combination of parts as will be hereinafter more fully described and pointed out in the claims.

Referring now to the drawing showing a preferred embodiment and one modification of the invention:

Figure 1 is a side elevation of my improved flash-light;

Figure 2 is a top plan view thereof;

Figure 3 is an inside plan view of the rotatable cap;

Figure 4 is a transverse section taken on the line 4—4 of Figure 1;

Figure 5 is a similar view but taken on the line 5—5 of Figure 1;

Figure 6 is a fragmentary sectional view through the upper end of the flash-light barrel and the cap with parts broken away for the sake of convenience;

Figure 7 is a fragmentary detailed section along the line of the retaining pin;

Figure 8 is a fragmentary cross section through the spring locking pin in its detent position taken on the line 8—8 of Figure 7;

Figure 9 is a fragmentary sectional view at the lower end of the flash-light; and Figure 10 shows a modified form of cap provided with numerals on the lenses.

Referring now more particularly to the drawing, and for the moment to Figure 1, there is shown my improved signaling device, consisting of the metal barrel 1 with the screw cap 2 at the base thereof, while within the cap, as may be seen in Figure 9, is the usual spring 3, provided to hold the batteries 4 in their operative position.

In the upper end of the barrel 1 is secured a reflector 5 in which is the lamp socket 6, which carries the lamp 7. To the rear of the lamp socket 6 is a conducting spring arm 8, which is designed to contact with a battery post 9, as may be seen in Figure 6.

The barrel is cut away to form the window, as at 10, directly in front of the reflector. Located just above the reflector, as may be seen in Figure 4, are the two arms or nibs 11, which support the insulating fiber disc 12 in which is located the central stud 13 and the connecting spring contact 14. To this latter spring 14 extends the lead wire 15, which, as may be also seen in Figure 6, is connected to the heretofore mentioned socket 6.

Also supported on the stud 13 is the cylindrical rotative cap 16, which is illustrated as having four equally spaced lenses 17 fitted therein and so located that when the cap 16 is rotatably mounted on the aforementioned stud 13, the several lenses may be respectively brought into registry with the heretofore mentioned window 10 which is to be illuminated by the lamp 7.

These lenses 17 may be of various colors, such as red, blue, green, and there may be one white lens 17x, if desired. Also, as shown in Figure 10, in the modified form the cap 16' may have the several lenses 17', and on these several lenses may appear any desired numeral, the numeral 3 being illustrated in Figure 10 on the front lens. The other lenses might have the respective numerals 1, 2, and 4. The numerals may be black to show the number in silhouette, or it may be transparent so that the light will shine therethrough.

Now, to form the electrical contact through the batteries and lamp on a turn of the cap, there is shown in the cap (Figure 3) an insulated disc 18 having four contact plates 19 set therein. There may also be seen the central aperture through which the heretofore mentioned stud 13 passes, so that the cap may be held from removal thereon by the nut or cap screw 20.

The several contact plates 19 are in respective alinement with their lenses in the cap, so that when a contact plate 19 is in contact with the contacting arm 14, the lamp in the reflector will light and throw the beam through its respective lens, which may be the green lens, or other lens, depending on which plate is in contact with the contact arm 14.

When the cap 16 is rotated through a part turn so that none of the plates 19 are in contact with the arm 14, then the lamp will remain unlighted.

So that, when the flash-light is laid down, where the cap might accidentally rotate and the light be left burning, I have provided a spring detent arm 21 fastened to the inner side of the barrel, with its pin 22; and I have also provided four depressions 23, equally spaced about the inner edge of the cap, so that when the cap is rotated to an "off" position, the pin 22 of the spring detent finger 21 will engage a respective detent depression 23 on the inner surface of the cap, and thus prevent the cap from accidentally turning. Thus it is necessary for the operator to rotate the cap with enough force to push the detent out of its receiving depression. This is illutrated in Figures 7 and 8. Other forms of detents or means for holding the cap in an "off" position might also be used.

The operation is exceedingly simple, as will be readily understood. The signalling device may be gripped in the one hand by the barrel, and with the thumb and forefinger, the cap may be rotated until a lens comes in registry with the window in the flash-light at which time the light will be thrown on and flashed through the lens that is in front of the light. If the operator desires to flash a blue light, and should the operator not know whether the blue lens is in front of the light, he may hold the same in front of his face or up against his body, rotate the cap until such time as the desired lens is in front of the light window, and then signal the desired information by flashing the pre-arranged light.

From the foregoing, it will be seen that I have provided a signal device wherein four predetermined signals may be flashed, and in fact additional windows can be built into the cap, necessitating only corresponding additional contact plates on the inner surface of the cap. Also, it will be seen that to change the signal is but the matter of a moment; and finally, there is no possibility of the signal cap accidentally rotating, and thus leave the light on only to discharge the batteries.

Having thus described my invention what I desire to secure by Letters Patent is:

1. In a flash-light signaling device, a barrel having a window formed in the side wall thereof near its upper end, a lamp located behind the window, a rotatable cylindrical cap mounted over the upper end of the barrel and also provided with a plurality of windows having different colored lenses mounted therein and adapted to be rotatably brought in front of the aforementioned window in the barrel, an electrical contact means located on the under surface of the cap for each window in the cap and adapted to complete an electrical circuit through the batteries and the aforementioned lamp when a window in the cap is brought into registry with the window in the barrel, and means for holding the rotatable cap with the windows in a non-registering position.

2. In a flash-light signaling device, a barrel having a window formed in the side wall thereof near its upper end, a lamp located behind the window, a rotatable cylindrical cap mounted over the upper end of the flash-light barrel and provided with a plurality of windows having different indicia thereon and the said windows adapted to be rotatably brought in registry with the window in the barrel, a plurality of electrical contacts, located on the under surface of the cap, one for each window and adapted to complete the electric circuit in the aforementioned lamp when a window in the rotatable cap is in registry with the window in the barrel, and spring means for holding the rotatable cap in one of a plurality of non-registering positions to thereby provide against an accidental rotation of said cap when said signaling device is not in use.

3. In a flash-light signaling device, a barrel, said barrel having a window formed on its one side and a lamp mounted behind said window and adapted to contact with one pole of the batteries to be carried in said barrel, a spring arm carried near the top of the barrel and also in circuit with the lamps and batteries, a rotatable cap having a plurality of windows mounted therein having different indicia on each window, an insulated disc on the inner surface of the cap and a plurality of contact points in said disc, the said contacts adapted to progressively close the circuit between the batteries and the lamp as the said cap is rotated, each of said contacts associated with its respective window, and means for holding the rotatable cap against accidental rotation.

JOHN H. WEINER.